Patented Aug. 22, 1933

1,923,723

UNITED STATES PATENT OFFICE 1,923,723

METHOD OF MANUFACTURING INSOLUBLE SULPHUR

Albert J. Gracia, Cuyahoga Falls, Ohio, assignor to The Goodyear Tire & Rubber Company, Akron, Ohio, a Corporation of Ohio No Drawing. Application October 5, 1932
Serial No. 636,351

10 Claims. (Cl. 23—224)

This invention relates to a process of manufacturing insoluble sulphur. More particularly, it relates to a method of treating "flowers of sulphur" or similar mixtures of soluble and insoluble sulphurs so as to obtain a mixture of sulphurs containing insoluble sulphur in a proportion higher than that in which it is present in the starting material. In the rubber industry, among others, it is frequently desirable to employ insoluble sulphur itself or mixtures of soluble sulphur and insoluble sulphur in which the proportion of insoluble sulphur is relatively high.

Thus, one of the principal objects of the invention is the provision of a simple method for obtaining a mixture of soluble and insoluble sulphurs containing insoluble sulphur in a proportion higher than that in the starting material. Another object is to provide an inexpensive, rapid method for obtaining comparatively pure insoluble sulphur. Other objects and advantages will become apparent as the description of the invention proceeds.

This invention resides in the discovery that by heating mixtures of benzene and "flowers of sulphur" or similar mixtures of soluble and insoluble sulphurs, hot filtering the material, and drying the undissolved material, insoluble sulphur may be obtained in any proportion varying from its percentage in the starting material to 100%. By taking advantage of the fact that insoluble sulphur, or S mu as it is frequently called, is substantially insoluble in benzene and soluble sulphur, or S lambda, is rather soluble in benzene at elevated temperatures and only slightly soluble at ordinary temperatures, separation may be easily accomplished. The solubility of S lambda in benzene at its boiling point, 80 degrees C., is 11.7 grams per 100 grams benzene and at 20 degrees C. is only 1.7 grams per 100 grams benzene. Thus, knowing the proportion of insoluble sulphur in the mixture of sulphurs, and the solubility of S lambda in benzene at the temperature at which the materials are to be heated, it is simply necessary to agitate calculated amounts of the starting materials for a sufficient length of time at the requisite temperature to permit the desired amount of S lambda to dissolve in the benzene.

The next step is the hot filtration of the material in suitable apparatus such as a steam-heated filter press maintained substantially at the temperature of the boiling solvent. In this step the insoluble sulphur portion is undissolved, leaving as a filtrate the saturated solution of soluble sulphur in benzene. Following this it will generally be found desirable to dry the insoluble sulphur.

In this process either the amount of benzene used or the temperature of the solution may be varied in order to obtain the desired mixture of sulphurs. Thus, when an amount of benzene insufficient to dissolve all the soluble sulphur in the mixture of sulphurs is employed, the excess soluble sulphur will remain undissolved with the insoluble sulphur. For maximum efficiency it will usually be desirable to heat the materials in the neighborhood of the boiling point of benzene (80 degrees C.) and vary the quantities of benzene used in order to obtain the percentage of insoluble sulphur desired in the final product.

Although it is to be understood that a mixture of sulphurs containing soluble and insoluble sulphurs in any proportion may be employed, the invention will be described in detail as applied to "flowers of sulphur", a commercial mixture containing insoluble and soluble sulphurs in the approximate proportions of thirty and seventy percent, respectively. Thus, in the preparation of a mixture of sulphurs, to contain eighty percent insoluble and twenty percent soluble, from "flowers of sulphur", 55 gallons of benzene and 52 pounds of "flowers of sulphur" are placed in a jacketed extraction kettle. With agitation sufficient to maintain the sulphur in a state of suspension, the mixture is heated to 80 degrees C., the boiling point of benzene, and there refluxed for approximately one hour.

At the expiration of this period the batch is filtered through a steam-heated filter press maintained at approximately 80 degrees C. The undissolved sulphur in the heated press is then dried with air for about one half hour after which it is discharged and permitted to dry further in the open air. The product, obtained in a yield of 20 pounds, contains approximately 80% of insoluble sulphur and 20% of soluble sulphur.

The benzene filtrate is allowed to cool to room temperature whereupon nearly all the soluble sulphur crystallizes out of solution. It is then removed by filtration, leaving the recovered benzene ready for use in extracting more "flowers of sulphur" without the necessity for distillation or other purification processes. About 31 pounds of quite pure soluble sulphur are obtained.

It is readily apparent that by this invention there is provided a simple, rapid and inexpensive method of preparing a mixture of sulphurs containing insoluble sulphur in a higher proportion than in the original mixture. Also, by employing ascertained amounts of benzene and sulphur and heating the materials to a definite temperature, insoluble sulphur in whatever increased proportions desired may be obtained. Further, the use of complicated apparatus is obviated. In addition, the products obtained may be used substantially as such without further treatment.

It will be apparent that numerous changes may be made in the procedure to be followed and the temperatures and proportions employed without departing from the inventive concept. It is intended that the patent shall cover, by suitable expression in the appended claims, whatever features of patentable novelty reside in the invention.

What is claimed is:

1. A process of preparing insoluble sulphur which comprises agitating a mixture of benzene and flowers of sulphur at approximately 80 degrees C., filtering the hot material and drying the sulphur.

2. A process of treating flowers of sulphur which comprises agitating it with benzene at a temperature just below the boiling point of the benzene, filtering the hot material and drying the undissolved sulphur.

3. A process of treating flowers of sulphur which comprises agitating it with benzene at a temperature just below the boiling point of the benzene and filtering the material in apparatus maintained at approximately said temperature.

4. A process of treating flowers of sulphur which comprises agitating it with benzene at 80 degrees C. and filtering the hot material in apparatus maintained at 80 degrees C.

5. A process of preparing insoluble sulphur and soluble sulphur in mixtures varying in the proportion of insoluble sulphur from 30 percent to 100 percent, which comprises agitating flowers of sulphur with benzene at a temperature in the neighborhood of the boiling point of benzene, filtering the hot material in apparatus maintained at said temperature and drying the precipitate.

6. A process of preparing insoluble sulphur and soluble sulphur in mixtures varying in the proportion of insoluble sulphur from 30 percent to 100 percent, which comprises agitating flowers of sulphur and benzene at a superatmospheric temperature and filtering the hot material in apparatus maintained at said temperature.

7. A process of treating a mixture of insoluble and soluble sulphurs to give a composition of insoluble and soluble sulphurs of higher insoluble sulphur content which comprises agitating said mixture with benzene, refluxing the materials at the boiling point of the benzene and filtering the hot material in apparatus maintained at approximately the same temperature.

8. A process of preparing a mixture of sulphurs in the approximate proportion of 80 percent insoluble sulphur and 20 percent soluble sulphur which comprises agitating and refluxing, for approximately one hour at a temperature in the neighborhood of 80 degrees C., flowers of sulphur and benzene in the approximate proportions of 52 pounds of sulphur and 55 gallons of benzene, thereafter filtering the hot material in apparatus maintained at substantially the temperature of the refluxing operation.

9. A process of treating a mixture of insoluble and soluble sulphurs which comprises mixing it with benzene at a temperature just below the boiling point of the benzene and filtering the material in apparatus maintained at approximately said temperature.

10. A process of treating a mixture of insoluble and soluble sulphurs which comprises mixing it with benzene at a temperature just below the boiling point of the benzene, filtering the hot material and drying the undissolved sulphur.

ALBERT J. GRACIA.